(12) United States Patent
Kobayashi

(10) Patent No.: US 7,698,968 B2
(45) Date of Patent: Apr. 20, 2010

(54) METHOD FOR REDUCING INPUT-SIDE HOLDING TORQUE OF WAVE GEAR DEVICE, AND ROTARY ACTUATOR

(75) Inventor: Masaru Kobayashi, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 247 days.

(21) Appl. No.: 11/633,312

(22) Filed: Dec. 4, 2006

(65) Prior Publication Data

US 2007/0199405 A1 Aug. 30, 2007

(30) Foreign Application Priority Data

Feb. 28, 2006 (JP) ............................. 2006-051554

(51) Int. Cl.
*F16H 1/32* (2006.01)
(52) U.S. Cl. ....................................... 74/640
(58) Field of Classification Search ................... 74/640; 901/23, 25
See application file for complete search history.

(56) References Cited

U.S. PATENT DOCUMENTS 5,222,409 A * 6/1993 Dalakian ................. 74/479.01

6,564,677 B1 * 5/2003 Kiyosawa et al. ............. 74/640

FOREIGN PATENT DOCUMENTS

| JP | 2004-122339 | 4/2004 |
|---|---|---|
| JP | 2004-181610 | 7/2004 |

* cited by examiner

*Primary Examiner*—Sherry L Estremsky
*Assistant Examiner*—Erin D Bishop
(74) *Attorney, Agent, or Firm*—Flynn, Thiel, Boutell & Tanis, P.C.

(57) ABSTRACT

In a wave gear device provided with a cup-shaped flexible external gear, the difference in the direction of the thrust force applied to the wave generator during speed reduction or speed increase is used to reduce the input-side holding torque. During speed reduction, thrust force F1 is applied to the wave generator in the direction toward the open side of the flexible external gear, and during speed increase, thrust force F2 is applied in the opposite direction. The plug of the wave generator is pressed against the friction plate mounted on the motor housing by the thrust force F2 applied during speed increase, and the friction force that is produced is used as part of the input-side holding torque for restraining the wave generator from rotating.

21 Claims, 2 Drawing Sheets

METHOD FOR REDUCING INPUT-SIDE HOLDING TORQUE OF WAVE GEAR DEVICE, AND ROTARY ACTUATOR

BACKGROUND OF THE INVENTION

1. Field of the Invention

The present invention relates to a method for reducing an input-side holding torque of a wave gear device in which the input-side holding torque for holding the wave generator that is an input-side member of the wave gear device is reduced so that the wave generator is not rotated by the torque applied from the load side. The present invention also relates to a rotary actuator in which the method is adopted.

2. Description of the Related Art

Rotary actuators provided with wave gear devices having a high positioning accuracy and a high reduction ratio are used in joint function mechanisms and the like of industrial robot hands. JP-A 2004-181610 and JP-A 2004-122339 disclose a robot hand provided with rotary actuators that have a wave gear device coupled to a motor shaft.

A wave gear device has a configuration in which an annular flexible external gear is coaxially disposed inside an annular rigid internal gear, and a wave generator is fitted therein. The wave generator is commonly elliptically contoured, and a state is formed in which the flexible external gear is elliptically flexed by the wave generator and in which the two gears mesh at the two ends of the elliptical shape in the direction of the major axis. The flexible external gear commonly has two fewer teeth than does the rigid internal gear. Therefore, when the wave generator is rotated by a motor, the meshing position of the two gears moves in the circumferential direction and a relative rotation corresponding to the tooth number difference is generated in the two gears. The rigid internal gear is usually fixed in place so as to prevent the rotation, and reduced rotations are outputted from the flexible external gear.

A cup-shaped flexible external gear and a silk hat-shaped flexible external gear are known as flexible external gears for a wave gear device with such a configuration. A cup-shaped flexible external gear has a cylindrical trunk, an annular diaphragm that extends radially inward from one end of the cylindrical trunk, a discoid or annular boss formed continuously on the internal peripheral edge of the diaphragm, and external teeth formed on the external peripheral surface of the other end of the cylindrical trunk. A silk hat-shaped flexible external gear has a cylindrical trunk, an annular diaphragm that widens radially outward from one end of the cylindrical trunk, an annular boss formed continuously on the outer peripheral edge of the diaphragm, and external teeth formed on the external peripheral surface of the other end of the cylindrical trunk.

Also known are wave gear devices that are referred to as a flat-type or a pancake-type wave gear devices. In these types of the wave gear devices, a cylindrical flexible external gear is disposed inside of two coaxially disposed rigid internal gears, and an elliptically contoured wave generator is fitted inside of the flexible external gear. One of the rigid internal gears has 2n (where n is a positive integer) more teeth than does the flexible external gear, and the other rigid internal gear has the same number of teeth as the flexible external gear. When the wave generator is rotated, a relative rotation is generated in the two rigid internal gears. By fixing one of the rigid internal gears in place so as to prevent the rotation, the reduced rotational output can be obtained from the other rigid internal gear.

FIG. 2 shows the relationship between the torque of the rotational input-side of the wave gear device (hereinafter referred to as "input-side torque") and the torque of the reduced rotational output-side (hereinafter referred to as "output-side torque" or "loading torque"). Line A in the diagram indicates the relationship during the speed reduction in which the wave generator is rotated, and the reduced rotations are outputted from the flexible external gear. Line B indicates the relationship during the speed increase in which the flexible external gear is rotated, and the high-speed rotation is outputted from the wave generator. It is apparent from lines A and B that in comparison to the speed increase, the input-side torque is high with respect to the output-side torque during the speed reduction.

In the joint mechanism of a robot hand, the high torque is outputted while the motor rotations are reduced via the wave gear device. In an operating pattern in which the output torque is maintained, the input-side torque can be kept low even when the output-side torque is high. Thus, the input-side holding torque, which holds the motor shaft connected to the wave generator of the wave gear device so that the shaft is not rotated by the loading torque (output-side torque), is kept low. For this reason, the value of the electric current of the motor for holding the motor shaft in a prescribed rotational position is also kept low.

An object of the present invention is to provide a method for reducing the input-side holding torque of the wave gear device in which the input-side holding torque required for holding the wave generator, which is an input-side rotating member of the wave gear device, can be further reduced so that the generator is not rotated by the loading torque.

SUMMARY OF THE INVENTION

In order to solve the problems described above, the input-side holding torque of the present invention can be reduced by using the difference in the direction of the thrust force applied to the wave generator during the speed reduction and during the speed increase in the wave gear device. In the wave gear device, the thrust force is applied to the wave generator during the speed reduction in the direction facing the output side of the speed-reducing rotations. During the speed increase, the thrust force is applied in the opposite direction. In the present invention, the constituent parts of the wave generator are moved by the thrust force that operates during the speed reduction. The constituent parts are pressed against the motor housing or another fixed member, and restrained using the frictional force produced by the pressing action so that the wave generator does not rotate. As a result, it is possible to reduce the input-side holding torque required for holding the wave generator, the motor shaft or other input-side rotating shaft connected thereto, so that the generator or the shaft is not rotated by the output-side torque (loading torque). Since the frictional force is not generated during the speed reduction, the efficiency is not decreased because of the frictional force.

Namely, the present invention is directed to a method for reducing the input-side holding torque required for holding the rotation input member of the wave gear device so that the rotation input member is not rotated by the loading torque applied to the reduced-speed rotation outputting gear of the wave gear device. The wave gear device comprises a rigid internal gear, a flexible external gear and a wave generator. The wave generator is the rotation input member. One of the rigid internal gear and the flexible external gear is the reduced-speed rotation outputting gear and the other is a fixed-side gear. A thrust force is generated and applied to the wave generator during the speed increase operation where the reduced-speed rotation outputting gear is rotated, and the increased-speed rotation is outputted from the wave gear device. A constituent part of the wave generator fixed to the input-side rotating shaft of a motor or the like is made to be a movable component that can be moved in an axial direction of the input-side rotating shaft. A fixed member is disposed at a position adjacent to the movable component in a direction in which the thrust force is applied. The thrust force applied to the wave generator and produced by the loading torque applied to the reduced-speed rotation outputting gear is used to press the movable component of the wave generator against the fixed member. The frictional force generated between the movable component and the fixed member is used as a part of the input-side holding torque.

A cup-shaped or silk hat-shaped flexible external gear is generally used as a flexible external gear of the wave gear device. It is apparent that the flexible external gear of the wave gear device that is referred to as a flat-type or a pancake-type wave gear device may be used.

The wave generator may comprise a cylindrical hub coaxially mounted on the rotation input shaft so as to be able to move in the axial direction, a plug coaxially mounted on the external peripheral surface of the hub, and a bearing having flexible bearing rings mounted on the external peripheral surface of the plug. The movable component is the hub and/or the plug.

It is preferable that the movable component of the wave generator is pressed against the fixed member via an interposed friction plate in order to obtain considerable frictional force.

It is also preferable that the movable component of the wave generator is urged using a spring or an urging member in a direction opposite to the direction in which the thrust force is applied.

The present invention also provides a rotary actuator of which the input-holding torque is reduced by the method described above. The rotary actuator comprises a motor, and a wave gear device for reducing and outputting the rotations of the motor. The input-side rotating shaft is a motor shaft, and the fixed member is a motor housing.

Here, the flexible external gear of the wave gear device may be shaped as a cup or a silk hat.

The wave generator may comprise a cylindrical hub coaxially mounted on the rotation input shaft so as to be able to move in the axial direction, a plug coaxially mounted on the external peripheral surface of the hub, and a bearing having flexible bearing rings mounted on the external peripheral surface of the plug. The movable component is the hub and/or the plug.

In order to increase the frictional force, it is preferable that the rotary actuator comprises a friction plate mounted on at least one contact surface selected from the contact surfaces of the motor housing and the movable component of the wave gear device.

It is also preferable that the rotary actuator comprises a spring or an urging member for urging the movable component of the wave gear device in the direction opposite from the direction in which the thrust force is applied.

In the present invention, the thrust force applied to the wave generator of the wave gear device is used to move the hub or the plug, which is a constituent part of the wave generator of the wave gear device, in the axial direction and also used to press the hub or the plug against the fixed member. The frictional force generated thereby is used as a rotation-restraining force of the wave generator. Therefore, the input-side holding torque required to hold the wave generator so that the generator is not rotated by the loading torque can be reduced by the amount equal to the generated frictional force.

In a robot arm or other component driven by the rotary actuator having the motor and the wave gear device, the motor current does not need to be increased in order to increase the motor-holding torque in case that an arm under the action of the torque is fixed in a certain position, in case that greater torque is applied from the output side in comparison with the considerable torque that is being transmitted, or in case that the brake force of an electromagnetic brake is too weak to keep the motor in a prescribed rotational position.

DETAILED DESCRIPTION OF THE PREFERRED EMBODIMENTS

Embodiments of a rotary actuator obtained by applying the method of the present invention will now be described with reference to the drawings.

Figure 1:
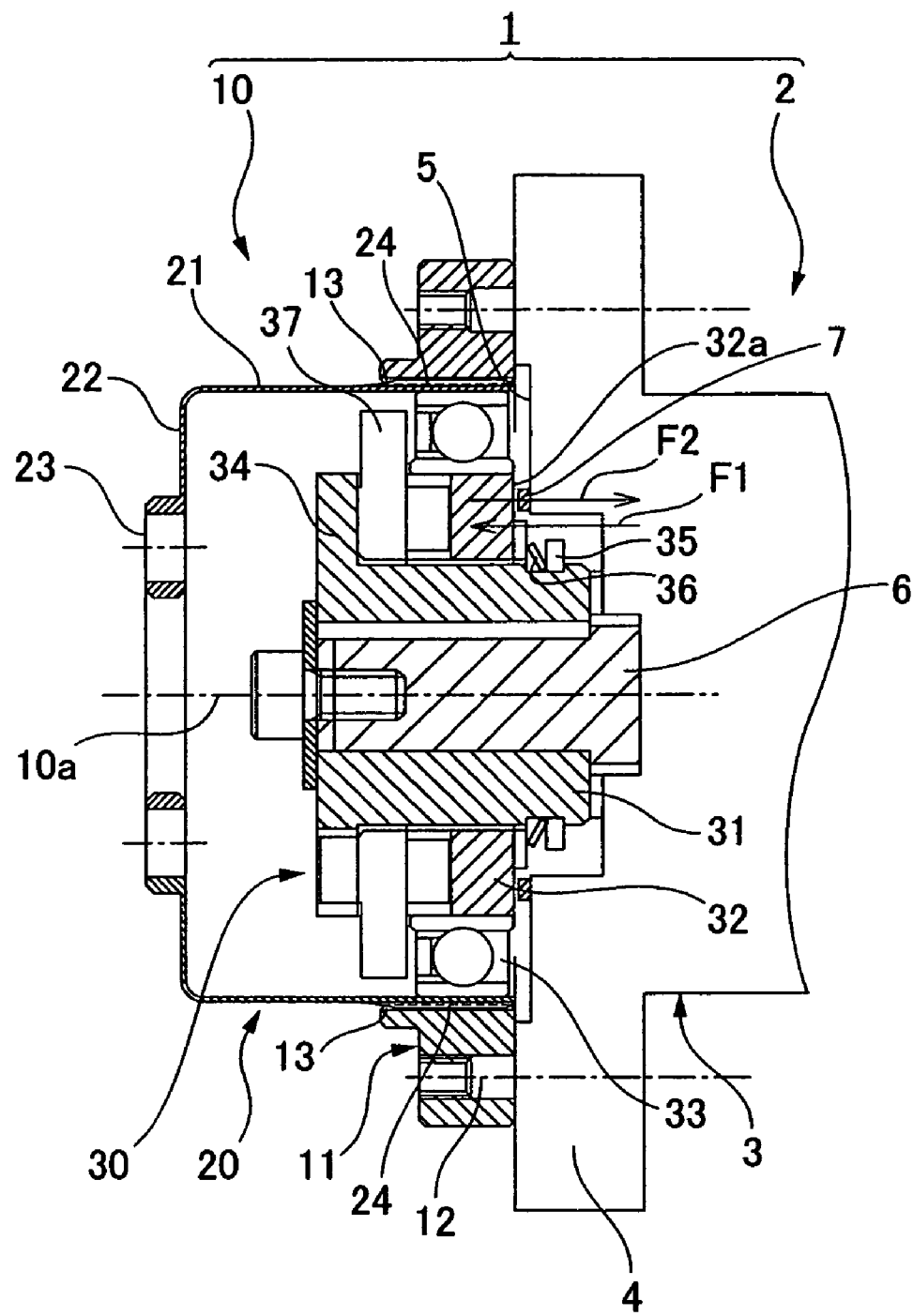
FIG. 1 is a partial sectional view depicting the main parts of a rotary actuator in which the present invention is applied.

FIG. 1 is a partial sectional view depicting the main parts of the rotary actuator of the present example. The rotary actuator 1 has a motor 2, and a wave gear device 10 that is coaxially connected to the motor 2. The wave gear device 10 is provided with an annular rigid internal gear 11, a cup-shaped flexible external gear 20 disposed inside the rigid internal gear, and an elliptically-contoured wave generator 30 disposed inside the flexible external gear.

The rigid internal gear 11 (a fixed-side gear) is coaxially fixed to the front surface of a large-diameter motor flange 4 formed on the front end of a motor housing 3. The gear 11 is fixed using fastening bolts 12 indicated by the alternate long and short dash lines. The cup-shaped flexible external gear 20 (a reduced-speed rotation outputting gear) disposed inside the rigid internal gear 11 comprises a cylindrical trunk 21, an annular diaphragm 22 extending inwardly in the radial direction from one end of the cylindrical trunk 21, and a thick annular boss 23 formed continuously on the internal peripheral edge of the cylindrical diaphragm 22. The boss 23 is connected and fixed to a loading member (not shown). External teeth 24 are formed on the external peripheral surface area at the other end of the cylindrical trunk 21, and the external teeth 24 can mesh with the internal teeth 13 of the rigid internal gear 11. The flexible external gear 20 is disposed with an orientation in which the end part on the open side of the cylindrical trunk 21 faces the front surface 5 of the motor housing 3.

The wave generator 30 (a rotation input member) comprises a cylindrical hub 31 coaxially fixed to a motor shaft 6 that protrudes forwardly from the center of the front surface 5 of the motor housing 3, an elliptically contoured plug 32 coaxially mounted on the external peripheral surface of the cylindrical hub 31, and a ball bearing 33 mounted on the external peripheral surface of the plug 32. The inner and outer rings of the ball bearing 33 are flexible rings, and the outer ring is elliptically flexed by the plug 32.

The wave generator 30 is fitted in the area on the open-end side of the cylindrical trunk 21 in which the external teeth 24 are formed in the cup-shaped flexible external gear 20. The area in which the external teeth 24 of the cylindrical trunk 21 are formed is elliptically flexed by the wave generator 30, and the portion of the external teeth 24 positioned at the two elliptical ends in the direction of the major axis mesh with a portion of the internal teeth 13 of the annular rigid internal gear 11.

Here, the elliptically contoured plug 32 is mounted on the cylindrical hub 31 in a state which allows movement in the direction of the device shaft line 10a. A large-diameter flange 34 is formed on the cylindrical hub 31 in the end portion of the side that is away from the motor 2, a retaining ring 35 is mounted on the external peripheral surface of the end portion on the side facing the motor 2, and the plug 32 is disposed between the flange 34 and the retaining ring 35. Also, a disc spring 36 is mounted between the retaining ring 35 and the plug 32, and the plug is constantly urged by the disc spring 36 toward the flange 34 side. An Oldham coupling 37 is disposed between the flange 34 and the plug 32, so that the plug 32 is mounted on the hub 31 in a state which allows movement in the radial direction of the hub 31.

An annular friction plate 7 is mounted on the portion of the front surface 5 of the motor housing 3 that is disposed opposite the motor-side end face 32a of the plug 32. When the plug 32 slides toward the motor along the device shaft line 10a, a state in which the end face 32a of the plug is pressed against the friction plate 7 is formed.

The operation and effects of the rotary actuator 1 having such a configuration will be described. The number of teeth in the rigid internal gear 11 is 2n (where n is a positive integer) greater than the number of teeth in the flexible external gear 20, and is ordinarily greater by two teeth. The wave generator 30, which is a rotating input member of the wave gear device 10, rotates when the motor 2 is driven and the motor shaft 6 is rotated. When the wave generator 30 rotates, the meshing location of the gears 11 and 20 moves, and the relative rotation is generated between the two gears 11 and 20. Since the rigid internal gear 11 is fixed in place, the flexible external gear 20, which is a reduced-rotation output member connected to the load side, rotates at a reduced speed with a speed reduction ratio that corresponds to the difference in the number of teeth, and the loading member (not shown) is rotatably driven.

During the speed reduction, the thrust force toward the reduced-rotation output side, i.e., the thrust force F1 in the direction away from the motor 2 in the present example, is applied to the wave generator 30 from the side of the flexible external gear 20. Therefore, the end face 32a of the plug 32 will not come into contact with the friction plate 7 on the side of the motor 2, and the rotation is not inhibited.

Figure 2:
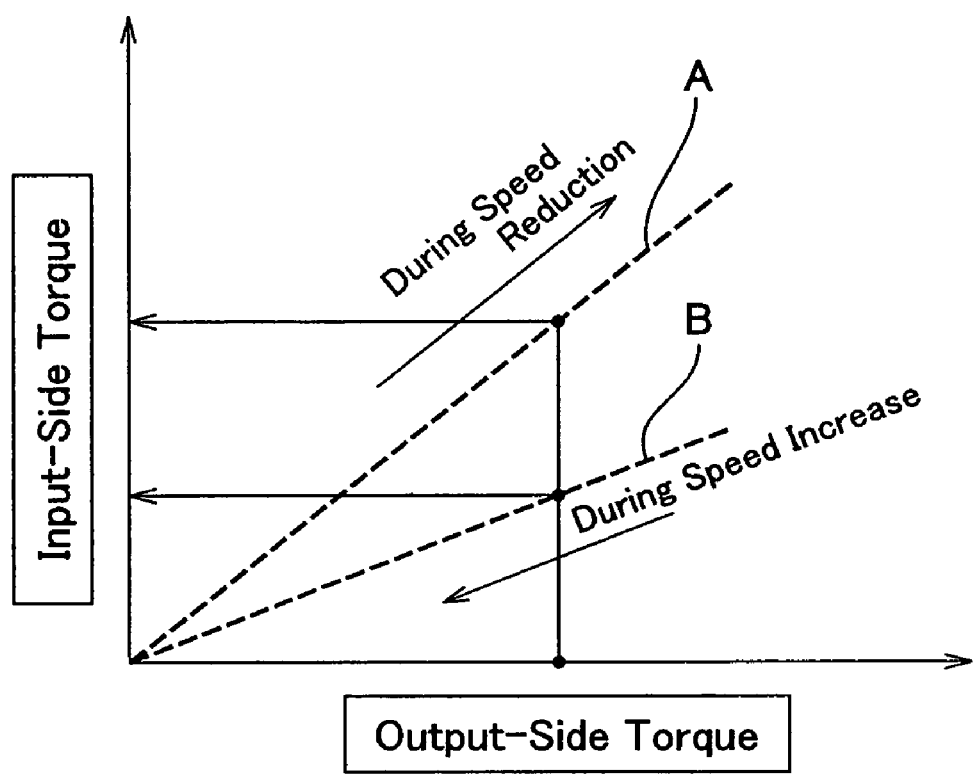
FIG. 2 is a diagram depicting the relationship between the input-side torque and the output-side torque during the speed increase and the speed reduction in a wave gear device.

Here, the motor 2 is stopped in a prescribed rotational position, and a prescribed electric current is allowed to flow to the motor 2. A prescribed motor-holding torque must be generated in order to hold the rotational position. A loading torque operates on the flexible external gear 20 of the wave gear device 10 when, for example, the robot arm is moved by the rotary actuator to a prescribed position and the arm is held in the position under a prescribed torque. This state is the same as the case in which the flexible external gear 20 is rotated and the speed-increasing rotation is outputted from the side of the wave generator 30. In this state, the input-side torque applied to the wave generator 30 is reduced, as shown by line B in FIG. 2.

In the state of the increased speed, the thrust force F2 is applied to the wave generator 30 from the flexible external gear 20 in the direction opposite from the direction maintained during the speed reduction. The plug 32 of the wave generator 30 can move in the direction of the shaft line 10a. When the thrust force F2 exceeds the urging force produced by the disc spring 36, the plug 32 is pressed toward the friction plate 7 of the motor housing 3 and is pressed against the friction plate 7. The frictional force produced thereby functions as a force that restrains the rotation of the wave generator 30.

Therefore, with the rotary actuator 1 of the present example, the wave generator 30 is pressed against the frictional plate 7. The frictional force produced thereby can be used as a force for holding the rotary actuator 1 in a prescribed rotational position in case that the rotary actuator 1 is to be held in a prescribed rotational position with the torque applied from the load side, or in case that the greater torque is applied from the load side in comparison with the considerable torque that is being transmitted. An effect is therefore obtained in such cases whereby the motor-holding torque is kept low.

The present example is an example in which the wave gear device having the cup-shaped flexible external gear is used, but the present invention can also be applied to a case that the wave gear device has the silk hat-shaped flexible external gear. The present invention can also be applied to in cases that a flat-type or a pancake-type wave gear device is used.

Furthermore, the wave generator hub may be moved and pressed to the motor housing to produce frictional force.

The friction plate may be mounted on the end face of the wave generator in lieu of being mounted on the side of the motor housing, and the friction plate may be mounted at both locations.

What is claimed is:

1. A method for reducing an input-side holding torque required for holding a rotation input member of a wave gear device, comprising the steps of:
    providing the wave gear device having a rigid internal gear, a flexible external gear and a wave generator as the rotation input member;
    mounting a movable component of the wave generator on an input-side rotating shaft of a motor, the movable component being movable in an axial direction of the input-side rotating shaft;
    disposing a fixed member at a position adjacent to the movable component in a direction in which a thrust force produced by a loading torque applied to the flexible external gear is applied, the fixed member being fixed in a rotational direction about an axis of the input-side rotating shaft and in the axial direction of the input-side rotating shaft;
    using the thrust force to press the movable component of the wave generator against the fixed member during operation of the wave gear device; and
    using a friction force generated between the movable component and the fixed member as part of the input-side holding torque.

2. The method of claim 1, wherein the flexible external gear of the wave gear device is cup-shaped or silk hat-shaped.

3. The method of claim 1, wherein the movable component comprises a cylindrical hub coaxially mounted on the input-side rotating shaft and movable in the axial direction of the input-side rotating shaft, a plug coaxially mounted on an external peripheral surface of the hub and a bearing having flexible bearing rings mounted on an external peripheral surface of the plug.

4. The method of claim 1, wherein the movable component is a hub and/or a plug.

5. The method of claim 1, wherein the movable component of the wave generator is pressed against the fixed member via an interposed friction plate.

6. The method of claim 1, wherein the movable component of the wave generator is urged using a spring or another urging member in a direction opposite to the direction in which the thrust force is applied.

7. The method of claim 1, wherein the input-side rotating shaft is a motor shaft.

8. The method of claim 1, wherein the wave generator comprises the rotation input member.

9. The method of claim 1, wherein one of the rigid internal gear and the flexible external gear is a reduced-speed rotation outputting gear and the other is a fixed-side gear.

10. The method for reducing the input-side holding torque required of claim 1, wherein the thrust force is generated and applied to the wave generator during a speed increasing operation in which the flexible external gear is rotated and an increased-speed rotation is outputted from the wave gear device.

11. The method of claim 1, wherein the fixed member is a motor housing.

12. A rotary actuator in which an input-side holding torque is reduced, comprising:
 a motor having an input-side rotating shaft;
 a wave gear device for reducing and outputting a rotation from the motor, the wave gear device comprising a rigid internal gear, a flexible external gear and a wave generator, the wave generator having a movable component mounted on the input-side rotating shaft which is movable in an axial direction of the input-side rotating shaft; and
 a fixed member disposed at a position adjacent to the movable component in a direction in which a thrust force is applied, the fixed member being fixed in a rotational direction about an axis of the input-side rotating shaft and in the axial direction of the input-side rotating shaft,
 wherein the thrust force produced by a loading torque applied to the flexible external gear of the wave gear device presses the movable component of the wave generator against the fixed member during operation of the wave gear device and a friction force is generated between the movable component and the fixed member as part of the input-side holding torque.

13. The rotary actuator according to claim 12, wherein the flexible external gear of the wave gear device is cup-shaped or silk hat-shaped.

14. The rotary actuator according to claim 12, wherein the movable component comprises a cylindrical hub coaxially mounted on the input-side rotating shaft and movable in the axial direction of the input-side rotating shaft, a plug coaxially mounted on an external peripheral surface of the hub and a bearing having flexible bearing rings mounted on an external peripheral surface of the plug.

15. The rotary actuator according to claim 12, wherein the movable component is a hub and/or a plug.

16. The rotary actuator according to claim 12, further comprising a spring or another urging member for urging the movable component of the wave generator in the direction opposite to the direction in which the thrust force is applied.

17. The rotary actuator according to claim 12, wherein the input-side rotating shaft is a motor shaft.

18. The rotary actuator according to claim 12, wherein the fixed member is a motor housing.

19. The rotary actuator according to claim 18, further comprising a friction plate mounted on at least one contact surface selected from contact surfaces of the motor housing and the movable component of the wave generator.

20. The rotary actuator according to claim 12, wherein one of the rigid internal gear and the flexible external gear is a reduced-speed rotation outputting gear and the other is a fixed-side gear.

21. The rotary actuator according to claim 12, wherein the thrust force is generated and applied to the wave generator during a speed increasing operation in which the flexible external gear is rotated and an increased-speed rotation is outputted from the wave gear device.

* * * * *